(12) United States Patent
Ravindran et al.

(10) Patent No.: US 7,924,715 B2
(45) Date of Patent: Apr. 12, 2011

(54) METHOD AND APPARATUS FOR DISCOVERING, NEGOTIATING, AND PROVISIONING END-TO-END SLAS BETWEEN MULTIPLE SERVICE PROVIDER DOMAINS

(75) Inventors: Ravishankar Ravindran, Ottawa (CA); Francois Blouin, Gatineau (CA); Delfin Montuno, Kanata (CA)

(73) Assignee: Nortel Networks Limited, Mississauga, Ontario (CA)

( * ) Notice: Subject to any disclaimer, the term of this patent is extended or adjusted under 35 U.S.C. 154(b) by 178 days.

(21) Appl. No.: 12/152,085

(22) Filed: May 12, 2008

(65) Prior Publication Data

US 2009/0279444 A1  Nov. 12, 2009

(51) Int. Cl.
  H04J 1/16 (2006.01)
(52) U.S. Cl. .............. 370/230; 370/238; 370/395.2
(58) Field of Classification Search .......... 709/218; 370/332, 401, 230, 238, 395.2
See application file for complete search history.

(56) References Cited

U.S. PATENT DOCUMENTS

| | | | | |
|---|---|---|---|---|
| 6,529,950 B1 * | 3/2003 | Lumelsky et al. | | 709/218 |
| 6,631,122 B1 * | 10/2003 | Arunachalam et al. | | 370/332 |
| 7,254,645 B2 * | 8/2007 | Nishi | | 709/249 |
| 7,403,482 B2 * | 7/2008 | Izmailov et al. | | 370/238 |
| 7,554,996 B2 * | 6/2009 | Previdi et al. | | 370/401 |
| 2002/0087699 A1 * | 7/2002 | Karagiannis et al. | | 709/227 |
| 2002/0181462 A1 * | 12/2002 | Surdila et al. | | 370/392 |
| 2003/0009580 A1 * | 1/2003 | Chen et al. | | 709/231 |
| 2003/0103510 A1 * | 6/2003 | Svanberg et al. | | 370/395.2 |
| 2004/0215817 A1 * | 10/2004 | Qing et al. | | 709/238 |
| 2005/0114541 A1 * | 5/2005 | Ghetie et al. | | 709/232 |
| 2006/0171315 A1 * | 8/2006 | Choi et al. | | 370/230 |

OTHER PUBLICATIONS

Industry Discussion Paper QOS Based VOIP Service Interconnectivity, Australian Communications Industry Forum (74 pages), Mar. 22, 2006.

International Telecommunications Union, Temporary Document (TD) 64 (WP 3/12) "Draft Recommendation G.fepo, Framework for Achieving End-to-End IP Performance Objectives" Jun. 13, 2006 (20 pages).

* cited by examiner

Primary Examiner — Ricky Ngo
Assistant Examiner — Dewanda Samuel
(74) Attorney, Agent, or Firm — Anderson Gorecki & Manaras LLP

(57) ABSTRACT

Domains (multiple collaborating service providers) create service offerings between pairs of edge nodes that interconnect with other domains in the network. The service offerings may specify the available bandwidth, quality of service, reliability, available security, price, subscriber and service contextual specific and other SLA information. When a new service is to be created, the service definition is used along with information about the available service offerings to determine a set of networks to implement the service. Information associated with the service offerings may be flooded to all other networks. Alternatively, the service offering information may be provided to a trusted third party (SLA broker) which may provide SLA services on the network to select sets of domains to implement inter-domain services, and may also proxy to set up the service for the SLA requesting party. A hybrid approach may also be used wherein some SLA information is flooded and other information is retained in secret and provided only to the SLA broker.

9 Claims, 4 Drawing Sheets

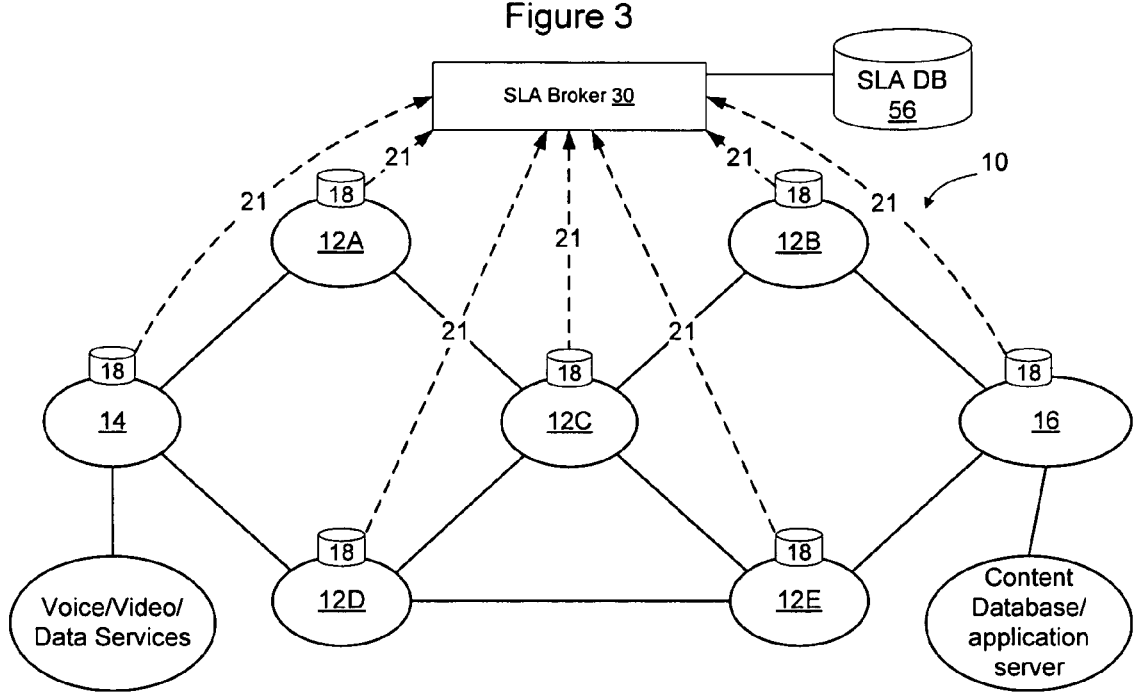
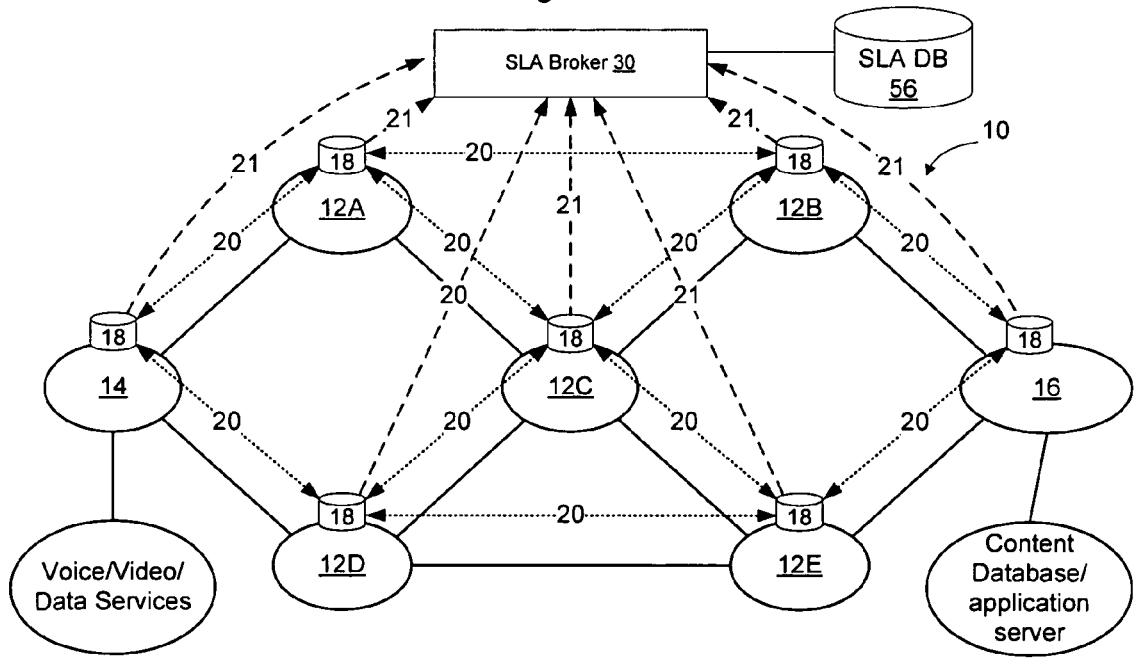

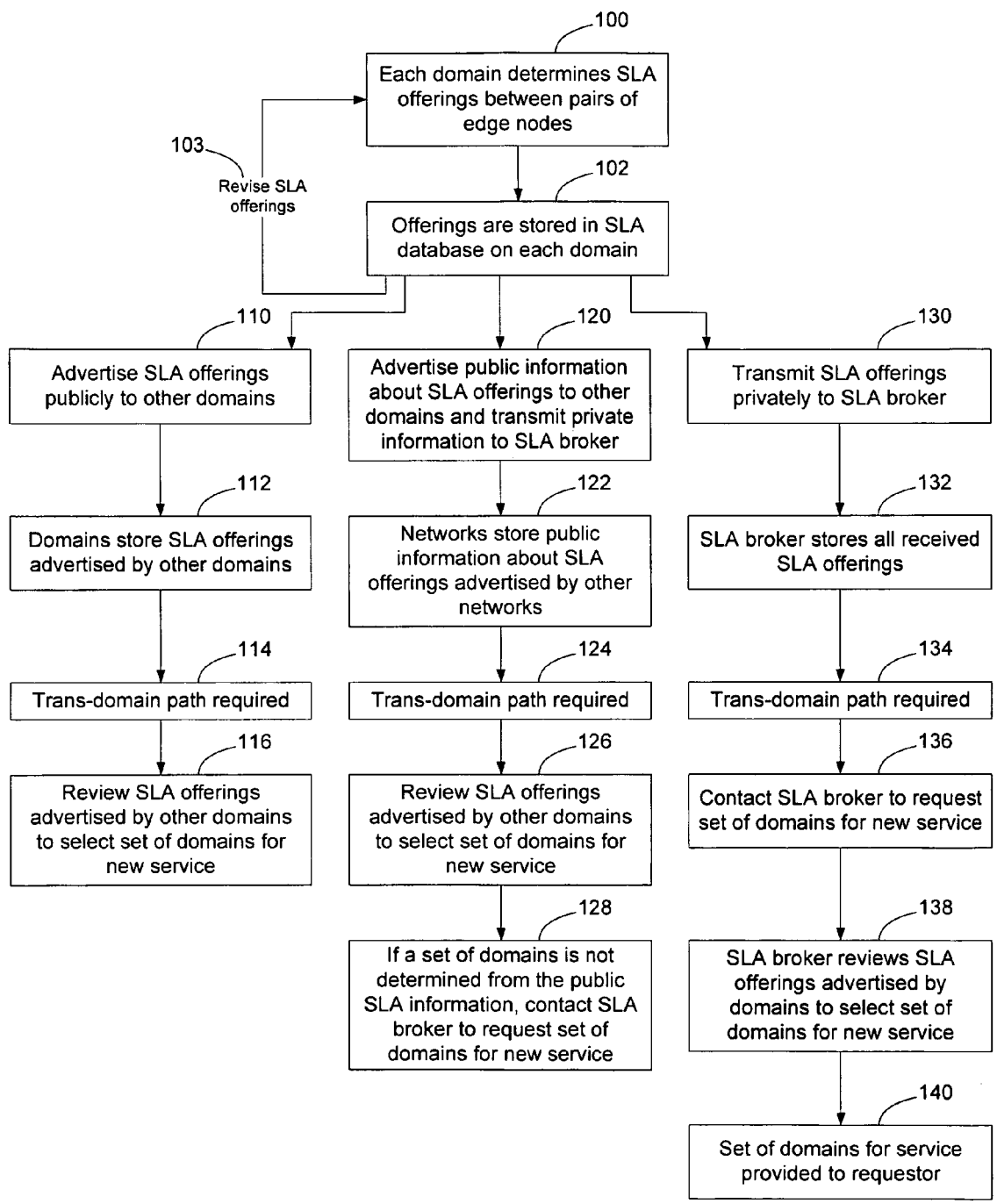

METHOD AND APPARATUS FOR DISCOVERING, NEGOTIATING, AND PROVISIONING END-TO-END SLAS BETWEEN MULTIPLE SERVICE PROVIDER DOMAINS

BACKGROUND OF THE INVENTION

1. Field of the Invention

The present invention relates to communication networks and, more particularly, to a method and apparatus for discovering, negotiating, and provisioning, End-to-End SLAs between multiple service provider domains.

2. Description of the Related Art

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol (IP) packets, Ethernet frames, data cells, segments, or other logical associations of bits/bytes of data, between the network elements by utilizing one or more communication links between the devices. A particular protocol data unit may be handled by multiple network elements and cross multiple communication links as it travels between its source and its destination over the network.

A large network may be managed by multiple administrative domains, which may be owned by the same entity or owned by different entities. The domains may be interconnected to enable customers on one domain to exchange data with customers on another domain or with servers that are connected to another domain. Large numbers of domains may be interconnected in this manner, such that a given path across the network may span multiple domains which possibly may be owned by many different entities.

A service provider may have contracts with customers to provide access to the network and to implement services for the customers on the network. The Service provider may provide any type of network service, such as access, metro or core. An agreement that specifies the type of network access and network services to be provided is commonly referred to as a Service Level Agreement (SLA). The SLA may specify many aspects of the service that is to be provided to the customer on the network. For example, the SLA may specify the QoS to be provided to the customer in terms of committed Bandwidth, Delay, Jitter and Packet Loss Ratio, the availability of the network, the security to be provided for the service, and also whether the service is provided is in the form of a Virtual Private Network (VPN) service with the above mentioned guarantees.

When the service provider enters into an SLA with a customer for a service that is required to traverse multiple domains implemented and provided by multiple third parties, the provider may want to learn the guarantees in terms of QoS, availability and what security guarantees, may be expected from the networks owned by those third parties. Thus, the service provider may wish to know what service offerings are available from the other domains before entering into a SLA with a customer to provide a particular set of services.

Additionally, a service provider may be able to provide the same service using multiple different network providers by selecting different paths through multiple providers to cause the service to traverse different intermediate domains. Thus, a service provider may wish to learn the type of service assurances that intermediate domains can provide and the costs of those services, and then select a set of network providers that are able to provide network connectivity that will allow the access provider to satisfy the SLA that it has entered with its customer. In this instance, a provider would like to obtain SLA information from third party service providers and then select one or more network service providers that may provide the connectivity for the customer, while striking a balance between various service constraints such as service realization Cost, QoS, Availability and Security requirements.

With respect to service provisioning, service providers have typically followed a 'walled garden' approach, in which the internal properties of a network are available to an access provider only through closed door contact and negotiations. Such a setup is usually unproductive and does not enable a dynamic service creation paradigm. Unfortunately, the type of service assurance information desired by access providers is not available where service providers are operating in a walled garden approach. Thus, a provider may not have information about the types of services that may be available end-to-end through the network when entering into the service level agreement with the customer. Particularly where the provider would like to set up a service dynamically, the provider may not know the state of the other provider networks to negotiate SLAs for service assurances and provision services on demand. For example, the customers on a provider network may want to subscribe to a live event and be provided with particular guarantees as to available bandwidth, delay, jitter, etc., before agreeing to pay for access to the live event. Since the provider doesn't have access to this information about the capabilities of the intermediate network domains, the provider may not know what type of services may be available on the network as a whole. Accordingly, it would be advantageous to provide a method and apparatus for exchanging SLA information between network domains.

SUMMARY OF THE INVENTION

A method and apparatus provides for discovering, negotiating, and provisioning End-to-End SLAs between multiple service provider domains. In one embodiment, a distributed approach is implemented in which networks can exchange SLA information in a distributed manner between domains using reliable flooding, so that any domain can use this information locally to determine other domain capabilities and select a group of intermediate service provider domains that are able to provide services that provide particular performance related and business SLA assurances for the service it intends to provision.

In another embodiment, a centralized approach is implemented which uses a third party trusted service broker model that allows each domain to register its SLA information with a trusted broker. When a domain needs to provision a service through the network, it can contact the broker to request the broker to compute an appropriate set of domains that can satisfy the performance related and business SLA metrics for the initiating system.

In a third embodiment, a hybrid model is implemented wherein domains have the flexibility of selectively sharing information publicly by flooding SLA information that they are willing to share, and uploading other SLA information to a trusted broker. The domains may use the available flooded information to select a group of domains for a given service, or may request the broker to find the set of domains that satisfies its SLA needs.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 3 is a functional block diagram of a portion of an example communication network showing the exchange of SLA information between domains using a trusted SLA broker;

FIG. 4 is a functional block diagram of a portion of an example communication network showing the exchange of SLA information between domains directly and using a HYBRID trusted SLA broker;

FIG. 5 is a flow chart illustrating a process of exchanging and use of SLA information between network domains.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
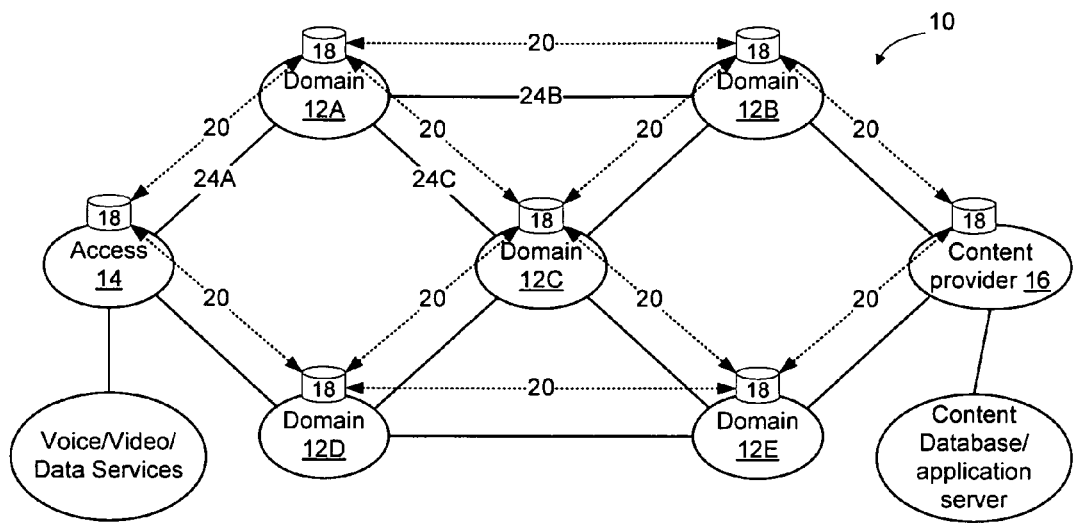
FIG. 1 is a functional block diagram of a portion of an example communication network showing the exchange of SLA information between domains directly.

FIG. 1 shows an example network in which a plurality of domains 12A-12E are interconnected to form a larger network 10. The domains 12 may be independent administrative domains that are owned and operated by different business entities, or alternatively some or all of the domains may be owned and operated by the same business entity. Many different network scenarios are possible and the invention is not limited to an implementation that operates on a network configured exactly as the network shown in FIG. 1. As used herein, the term "domain" will refer to a set of network elements that operate using a common routing instance or otherwise are implemented from an administrative perspective as implementing a common network control plane.

As shown in FIG. 1, the network 10 includes one or more access providers 14 and one or more content providers 16. Depending on the implementation, each of the entities 12, 14, 16, may assume multiple roles. Thus, a given entity such as access provider 14 may operate as a content provider and provide content on the network, as well as provide network services to other access networks. Thus, the role of a given entity may change depending on the context of the service to be implemented. For simplicity, FIG. 1 has been shown as having a content provider 16 on one side of the network, an access provider on the other side, and multiple network domains 12 interconnecting the access provider 14 and content provider 16. In operation, multiple such scenarios would coexist simultaneously on the network 10.

In the network shown in FIG. 1, each of the network domains implements a SLA system 18. The SLA system is responsible for determining SLA parameters of its own domain and summarizing and exchanging the SLA parameters with the other domains. Arrows 20 in FIG. 1 show the transmission of SLA information between domains. Where a peering relationship is used, as shown in FIG. 1, the SLA parameters for a domain may be exchanged directly with the other SLA discovery agents in the other domains. Where a trusted SLA broker is used (see FIG. 3), the SLA parameters may be transmitted to the SLA broker rather than directly between the domains. Optionally a hybrid approach may be used (see FIG. 4) in which the domains exchange some information with each other directly, while exchanging other information with the SLA broker. Each of these embodiments will be described in greater detail below.

Cooperating network domains abstract their available SLA capabilities between peering border nodes that provide connectivity to other domains. A given network domain may have multiple peering border nodes that provide connectivity to other domains. Thus, the domain will compute SLA parameters between each pair of peering border nodes to generate a set of available SLA capability information.

The SLA capability information may include several different types of metrics, such as performance related metrics and a business metrics. The performance related metric relates to the guarantees the network may offer, and includes attributes in terms of quality of service, availability, security, and other aspects that are performance related, and specify the requirements of the service the domain is required to meet in connection with the application flow requirements when the flow traverses the network. These performance related metrics relate to the ability of the domain to implement a particular service offering between a pair of border nodes and, hence, to the ability of the network to transport data from one peer domain to another peer domain extending guarantees in terms of QoS, Reliability and Security functions.

The business metric could be derived from traditional and non-traditional areas that define SLA offerings in terms of pricing, context and behavioral properties giving other provider domains the ability to determine the information and adapt it for its own use. Traditional metrics like pricing relates to how much the network provider would like to charge to implement particular types of services on the network. Other non-traditional metrics like context and behavioral information such as performance and usage statistics, subscriber preferences, and other statistics, could be shared between provider domains to exploit and leverage the knowledge and capabilities of a domain related to its own subscribers and supported services as a means of new source of revenues, allowing other domains to make more conscious decision. Further the business metrics, like the performance related metrics, may be node-pair specific such that each path through the network (represented by a pair of ingress/egress nodes) may have its own set of metric definition. In addition the provider could also exploit its credibility in the market to advertise advanced metrics like Average Revenue Per User (ARPU) and churn rate. These broad set of business metrics could be used by other provider domains while selecting the subset of domains in connection with negotiating and provisioning a service.

The business metrics and performance related metrics may be related. For example, a network service provider may create several types of services that it is willing to provide between a set of peer nodes, and then attach business metrics to the defined services to enable the different services to be priced differently. Alternatively, the business metric may govern the type of service, such that upon a request for a service that does not exceed a particular cost, the network service provider may use the business metric to determine service assurances that would be available between the set of peer nodes at that cost level. Many different ways of selecting performance related attributes of the service and attaching these performance related attributes to a particular business metrics may be implemented.

Once the network service provider has generated a set of service level agreement (SLA) parameters (performance related metrics and business metrics), the network service provider may publicly share some or all of that information with other domains, or may share some or all of that information privately with a trusted SLA broker. Alternatively, the network service provider may share some SLA information with the other domains publicly while maintaining some of the SLA information private, and share the private SLA information with the trusted SLA broker.

FIG. 1 shows an embodiment in which SLA information is shared by peering domains. The process of sharing SLA information with other domains may be implemented in many different ways, such as by flooding the SLA information on the networks. Flooding is a well known mechanism and is used in several protocols including Open Shortest Path First (OSPF) and Intermediate System to Intermediate System (IS-IS). Other flooding mechanisms may be used as well and the particular manner of flooding may depend on the particular manner in which the networks are implemented. The overhead incurred in flooding SLA information in this case is expected to be much less than that encountered for link state exchanges in a routing protocol, as the time scale at which the exchanges will be triggered will be much longer, which in this case will be in the order of hours. Thus, multiple flooding mechanisms or other dissemination mechanisms may be used to enable the networks to exchange SLA information. In FIG. 1, the flooding of SLA information is shown by arrows 20.

In a distributed model, such as the model shown in FIG. 1, each domain exchanges SLA information with the other domains that are participating in the SLA information exchange. Thus, each domain generates SLA information and transmits the SLA information to its peer domains. Each domain uses its own SLA information and the SLA information from the peer domains to build a SLA database. When a domain needs to establish a service that is required to span several domains, the initiating system may use the SLA information stored in the SLA database to choose a set of domains that are able to meet the SLA requirements for the service. The initiating system can thus determine the available performance related capabilities of various trans-domain paths and learn how much it will cost to implement the service on the network. Where multiple paths may exist through the network, e.g. via different sets of domains, the initiating system may select a set of domains based on the performance related metrics advertised by the domains, based on the business metrics advertised by the domains, or both. The provider will also regularly update its SLA information and share it with others whenever there is a change in its own SLA capabilities, which can be triggered automatically using threshold metrics or through operator intervention.

In one embodiment, each domain maintains a database of SLA information (performance related metrics and business metrics) advertised by other domains. The network domain SLA database may maintain SLA information about the local domain as well. When a node on the network needs to establish a service, the node may pass the SLA requirements of the service to the network domain SLA database to request a set of intermediate network service providers to be selected to implement the service. Based on the constraints associated with the service as specified by the customer, the network domain SLA database may select one or more intermediate network service providers to be used to implement the service on the network.

Once the service has been configured in this manner, the service may be implemented on the network in a customary fashion. For example, the node may access a network management system or other type of system to enable the nodes on the network to create the service that has been identified using the network domain SLA database. Since many different types of networks exist, and the manner in which services are implemented on the networks differs depending on the technology used to implement the network, the particular manner in which the service is implemented will vary in operation.

Figure 2:
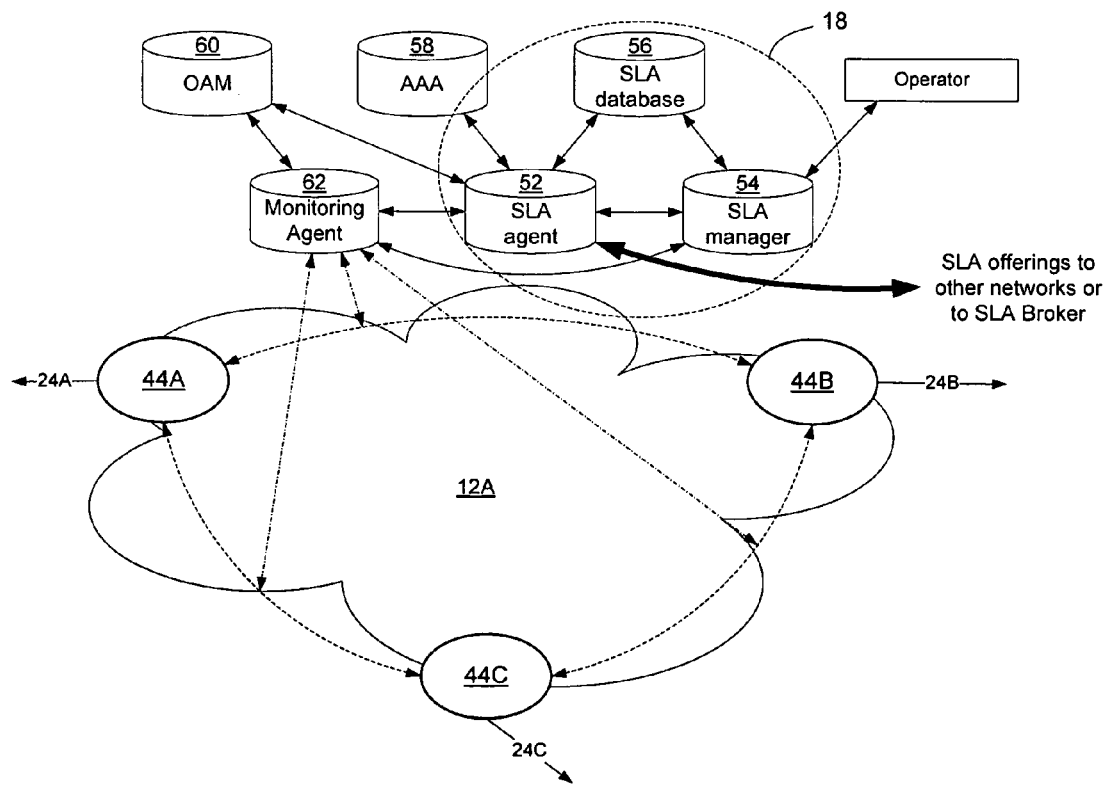
FIG. 2 is a functional block diagram showing one of the network domains of FIG. 1 in greater detail.

FIG. 2 shows one example of a domain 12 of the network of FIG. 1, and provides additional details about several of the components of a SLA system 18 that may be implemented in each domain to enable the domains to exchange SLA information. The domain 12 shown in greater detail in FIG. 2 may be used to implement one of the domains 12 of FIG. 1, as well as to implement the domains of FIGS. 3 and 4.

As shown in FIG. 2, each domain may implement several components that operate together to enable SLA information to be summarized and discovered, enable the network to be monitored, and enable the SLA information to be exchanged with other domains. In the embodiment shown in FIG. 2, the network domain 12 includes multiple Area Border Routers 44 configured to interconnect with other domains. For example, domain 12 is shown as including three area border routers 44, each of which is connected to a link 24 that connects that domain to another domain 12, to a service provider such as an access service provider, or to a content provider. Optionally multiple border routers 44 and/or links 24 may be used to interconnect pairs of domains for redundancy purposes. To facilitate explanation of the several embodiments and avoid obfuscation, many details associated with how the networks operate and other conventional aspects of how networks are implemented will be omitted, it being understood that a person skilled in the art would be able to understand that the networks may be implemented in many different ways.

The SLA system 18 collects SLA information that may be exchanged with other domains or with a trusted SLA broker. The type of SLA information that is collected may vary depending on the services being provided by the domain. For example, the domains may determine available QoS between pairs of nodes 44 that are used to interconnect various domains through the network. For example, domain 12A is shown as connected to a link 24A that connects the domain 12A with access provider 14. Similarly, domain 12A is connected to a link 24B that connects the domain 12A with domain 12B, and is connected to a link 24C that connects the domain 12A with domain 12C. The SLA agent 52 in domain 12A would determine the available quality of service that is able to be provided through domain 12A between nodes that connect with those links. This information would then be stored in a SLA database 56 associated with the SLA discovery agent 52.

Similarly, the SLA agent 52 may discover other aspects associated with the ability of the domain 12A to provide particular types of services on the network. Thus, for example, the SLA agent 52 may determine the affordable performance guarantees of the network in terms of bandwidth, delay, jitter, packet loss ratio, that are able to be provided between the access nodes 44A, B, C, the availability of the nodes to implement security on the network such as authentication, authorization, and encryption methods if available, pricing information for various service offerings between pairs of nodes on the network, and other types of parameters such as reliability (protection strategies i.e. 1:1 1:n, m:n), maximum outage duration guarantees, and other aspects of the service that may be of interest to entities when determining whether to select the network 12A to implement a service through the network.

The SLA system 18, in one embodiment, includes a SLA agent 52, a SLA manager 54, and a SLA database 56. The SLA agent collects SLA information from the domain, stores the SLA information in the SLA database 56, and floods the encoded SLA information to its neighboring peer domains or transmits the SLA information to the trusted SLA broker using a SLA Type Length Value (SLA TLV) control packet. Where the domains exchange SLA information with each other, the SLA agent also receives SLA information flooded from other domains and uses the SLA information to populate its SLA database. The SLA agent also performs the functions of receiving SLA requests, and enforcing them in the transport plane by interfacing with appropriate control and transport modules. Once a service has been requested and implemented, the SLA manager is responsible for monitoring the services that have been established through the network domain to make sure they comply with the advertised SLA capabilities. SLA manager also serves as an OAM interface to initiate, manage and provision SLA definitions through operator's intervention.

Since the SLA information depends on the pair of peer nodes (ingress/egress) that will implement the path through the network, the SLA information that is advertised includes information about which nodes are associated with the advertised SLA. This information may be specified by including the peer node MAC addresses, IP addresses, or in another manner. Where the SLA is directionally specific, the order in which the MAC addresses are placed in the SLA TLV may provide information as to the direction associated with the SLA TLV.

The SLA TLV will also include information about the metrics associated with the service that is able to be provided on the network. For example, the SLA TLV may include information about the availability, quality of service, security properties, and other aspects of the service. Finally, the SLA TLV may include pricing information to enable the pricing information to be communicated along with the other parameters of the service.

The SLA system 18 may also interact with other constructs on the domain 12, such as an Accounting, Authorization, and Authorization (AAA server) 58, an OAM manager 60 and a monitoring agent 62. In the embodiment shown in FIG. 2, the monitoring agent 62 and the OAM manager 60 monitor the network performance on the domain. For example, the performance of the network may be monitored to determine the Quality of Service being provided, e.g. in terms of bandwidth, delay, jitter, packet loss rate, and other factors. The monitoring agent may cause the OAM manager 60 to implement one or more OAM maintenance entities within the domain, e.g. between the area border routers 44, to monitor paths between the area border routers within the domain 12. The AAA server 58 may be polled to obtain pricing information which may be set in the domain by an operator. The AAA server 58 may also provide the SLA agent with information about security properties that may be enabled between a pair of peering nodes.

Although the exchange of SLA information has been highlighted in the previous discussion, there are other types of information that may be exchanged as well. For example, service connectivity requests, requests for changes in SLA agreements, SLA updates, and other types of information may also be exchanged by domains on the network.

Network service providers may not be willing to share their internal domain information with other service providers. However, to establish a service end-to-end across the network, it may be desirable to know what types of services are available and the pricing information for those services, so that a set of networks may be selected to implement the service. To accommodate these competing demands, according to an embodiment, a SLA broker 30 is used to hold the confidential SLA information. In this embodiment, the SLA broker is a trusted third party, whom the providers trust, and accordingly is an entity with whom the domains are willing to provide sensitive confidential SLA information in a secure manner. The SLA broker, in this embodiment, may be used to collect SLA information and perform SLA services on the network, so that the confidential SLA information may be provided to a third party and used to determine how a service should be set up, but which may allow the domains to keep the SLA information confidential and not disseminated to competing network service providers.

FIG. 3 shows an embodiment in which a SLA broker 30 is implemented on the network to enable network service providers to securely provide SLA information that may be used to implement inter-domain services, without requiring the dissemination of SLA information between competing network providers. In this embodiment, each domain determines what types of services it can provide between its sets of peer nodes as described above. Rather than having the service providers transmit SLA information with each other, however, the SLA information is instead transmitted to a SLA broker 30 that collects this information and maintains a SLA database 56 containing SLA information from the various domains 12. Transmission of SLA information to the SLA broker in a secure manner is shown by arrows 21 in FIGS. 3 and 4. The SLA information in this instance is the same as the SLA information that was discussed above, however rather than flooding the SLA TLVs to the collaborating domains, the SLA TLVs are securely transmitted (unicast) to the SLA broker.

The broker model also enables the provider to create and share with the service broker customized SLAs for different set of providers from whom it anticipates requests based on its own policies and priorities. This property is also true for the hybrid mode of SLA discovery discussed below in connection with FIG. 4. Thus, the SLA information may be node-pair specific and relate to the path through the network. Additionally, the SLA information may be third party provider specific, and relate to the contracting entity. By allowing different SLA information to be used for different contracting entities, different price structures and type of service offerings may be offered on the network for the different contracting entities. This may allow a service provider to give preferential pricing or treatment to select initiating domains, while giving standard pricing/service to other domains seeking to set up a service on the network.

When a new service is to be implemented on the network, the initiating system may transmit a SLA request to the SLA broker 30. The SLA request may specify the parameters of the service, such as the amount of bandwidth desired, the quality of service parameters such as delay and jitter that are acceptable for the service, the type of security required to be implemented by the nodes, reliability requirements, and other performance related parameters. The SLA request may also specify the aggregate cost that the user is willing to pay or other business parameters. The SLA broker 30 may use this information to key into the database to select a set of network providers that are able to fulfill the request. This search process is the same as the search process that would be performed in the first embodiment (where all of the SLA information was flooded). However, since the information is only provided to the SLA broker 30, the SLA broker 30 is able to perform a SLA matching process to select a set of domains without requiring the sensitive SLA information to be exchanged between competing service providers. If the SLA broker finds a set of domains that can implement the service as specified, the SLA broker will notify the initiating system and optionally also interact with the domains to cause the domains to set up their networks to handle the new service.

In other instances, the SLA broker 30 may determine that a set of domains is not available to fulfill the SLA request. In this instance, the SLA broker 30 may reply to the initiating system that a set of domains has not been found to fulfill the request. The SLA broker 30 may optionally find the closest available service that may be implemented and provide one or more alternatives to the initiating system to enable the initiating system optionally to select the best available service. For example, assume that an initiating system would like to set up a 100 Mb service for $50. If a service of this nature was not available at that price, the SLA broker 30 may respond with alternatives such as: Alternative 1-100 Mb service for $60, or Alternative 2-80 Mb service for $50. By providing the initiating system with alternatives the initiating system can select the best available service while still not obtaining information about the types of services the individual domains are able to provide, and while not obtaining individual pricing information associated with the individual domains.

The SLA broker 30, in this embodiment, is owned or operated by a trusted third party that is independent of the domains that it is serving. Thus, the third party may be trusted by the network service providers to maintain the confidential SLA information and use the confidential SLA information only as directed to select services to be implemented on the network.

Once the service has been selected, the SLA broker 30 may communicate with the SLA agents on the individual networks to establish the service. For example, assume that the SLA broker 30 receives a SLA request to establish a service from a content provider 16 to an access provider 14, and selects domains 12A, 12C, and 12B to fulfill the request. The SLA broker 30 may communicate this decision to the initiating system, and may also instruct the SLA agents on networks 12A, 12C, and 12B to set up the service between their respective pairs of nodes so that the service may be established on the network. If the service broker is also responsible for establishing the end-to-end path, the initiating system may be informed only of the ingress domain boarder router while the service broker takes care of the rest of the path establishment process. Optionally, the egress domain border router and the intermediate ingress/egress border routers may also be identified to the initiating system if requested. Within each individual network, the SLA agents may work with the nodes (routers, switches, and other network elements within the particular domain) to establish the service by reserving bandwidth, establishing the security parameters, and taking other actions to enable the service to be provided within that network.

Since the SLA broker 30 is able to match SLA requests with available service offerings, the network service providers are able to offer differentiated service offerings. For example, each domain may offer several different services between each pair of nodes with different pricing information associated with the several services. In operation, when an initiating system such as an access service provider needs to establish a service across the network, the initiating system will query the SLA broker 30 for a set of domains that may be used to implement the service. The set of domains may be selected to meet the performance related requirements of the service and also to meet the business requirements of the service. Thus, for example, the initiating system may specify the quality of service, the bandwidth, the security to be provided, and the not to exceed cost of the service. The SLA broker 30 will look for a set of domains that are collectively able to provide the service. If a match is found, the initiating system may be provided with a response indicating that the service will be established. The SLA broker 30 may then also transmit instructions to each of the SLA agents on networks that will be used to implement the service to allow the service agents to interact with their networks to establish the service on the multi-domain network.

Optionally, the SLA broker may also monitor the performance of established services and perform compliance monitoring to ensure the domains are meeting the guaranteed performance characteristics for the service. Where the SLA broker determines that a domain is not meeting its guaranteed performance parameters, the SLA broker may adjust the price for the service according to the business metrics provided by the domain. Enabling the SLA broker to monitor services being provided by the domains allows an initiating domain to be charged the price based on the services actually provided by the domains, rather than based on what the domains promised to provide.

Once the SLA agents have completed their portion of establishing the service, the SLA agents may respond to the SLA broker 30 or, alternatively, may transmit information to the initiating system to indicate that the service has been established. Once the service has been established, the initiating system may enable the customer to use the service on the network.

In the previous two examples, SLA information was either freely disseminated between network providers (first embodiment) or was kept completely in confidence (second embodiment). In a third embodiment, some of the SLA information is allowed to be transmitted between network service providers while other SLA information is maintained in secret. FIG. 4 shows an example of this embodiment. This third embodiment is thus a hybrid of the first two embodiments. Since some of the information will be maintained in confidence, the third embodiment, like the second embodiment, involves the use of a trusted SLA broker 30. However, non-confidential information is also allowed to be transmitted between the network service providers. The non-confidential information may thus be flooded like the first embodiment and used to update SLA databases on each of the network service providers. In FIG. 4, the arrows 20 represent SLA information that is being exchanged between domains, while the arrows 21 represent SLA information that is being forwarded to the trusted SLA broker 30. Although not shown, the flooded SLA information 20 may be forwarded to the trusted SLA broker 30 as well as between domains.

In this embodiment, since some SLA information is flooded between the network service providers, when a service provider needs to establish a new service on the network, the service provider may first look into the publicly available information stored e.g., in their local SLA database, to determine if the service may be implemented. This phase works as described above in connection with the first embodiment. However, if the publicly available SLA information does not enable a set of networks to be selected to implement the service, the application service provider may then transmit a SLA request to the SLA broker 30 to request the SLA broker 30 to select a set of domains for the service. Since the SLA broker 30 has additional SLA information that has not been flooded on the network, the SLA broker 30 may search through a larger set of SLA offerings to try to select a set of domains to implement the service. Optionally, the requests may be done concurrently to determine the available choices, and allow the initiating system to select from a service created using the public SLA information and a service created using the private SLA information.

The SLA service described herein allows multiple network service providers to exchange information directly or indirectly that will allow an end-to-end service to be determined across multiple network domains. When a service is needed, for example a multi-media service from a content provider, the SLA service enables the SLA requirements to be specified and allows a set of networks to be selected to implement the service.

Beyond enabling services to be negotiated, the SLA service also enables other business models to be implemented with respect to selling bandwidth. For example, networks may experience high and low bandwidth usage periods. During a period of low usage, the network may want to induce customers to use the available network resources. The SLA service described herein provides a way for the network to advertise its availability. In particular, by allowing a network to flood a SLA TLV with costing information for the service, the network provider may use the SLA TLV to advertise special pricing on bandwidth for services established between a pair of nodes on the network. This allows the network to, in effect, advertise temporary discounted pricing for particular services to induce users to take advantage of the period of low use on the network. The price could thus be set dynamically from time to time and for different time period dependent on business objective.

The SLA broker 30 may collect information from networks and, in one embodiment, may solicit information from the networks. For example, when the SLA broker 30 receives an SLA request and is not able to select a set of domains that are able to provide the service, the SLA broker 30 may send requests to the SLA agents on the networks to see if the SLA agents are willing to change their parameters to meet the SLA request. For example, if the SLA broker 30 is able to find two paths through the network that are able to meet the performance related requirements of a service description, but not the costing requirements of the service description, the SLA broker 30 may interact with the service agents to see if one or more of the networks are willing to reduce the costs of their leg of the service to enable the service to be implemented on the network. Similarly, where the SLA broker 30 is able to find two or more paths, the SLA broker 30 may allow the service agents on the domains to bid to obtain the service so that the lowest price path through the network may be obtained for the service. In this embodiment, the broker may act as proxy for the requestor to obtain the service on behalf of the requester.

FIG. 5 shows a flow chart of an example process that may be used to enable SLA information to be exchanged between multiple domains in a multiple domain network. In the embodiment shown in FIG. 5, each network determines the SLA offerings between pairs of edge nodes that peer with other domains in the network (100). The SLA offerings are stored by the SLA service in a SLA database or otherwise maintained by the domain (102). From time-to-time, the SLA offerings may be updated (103). In this event, the domain will determine the new SLA offerings and store those new service offerings in their SLA database. As service offerings are changed, the new SLA information will be sent out either alone or in connection with a message to refresh or retract the previously transmitted SLA information. Thus, for example, as SLA information is updated, the network domain may explicitly retract the previous SLA information by transmitting a retract message to the other domains and/or to the SLA broker. Alternatively, the domain may implicitly retract the previous SLA information by transmitting the new SLA information to the other domains and/or SLA broker.

Depending on the amount of sharing to be implemented by the domains, the SLA service offerings will either be advertised to the other domains (110), partially advertised to the other domains and partially transmitted securely to a trusted SLA broker (120), or only transmitted securely to a trusted SLA broker (130). Note that it is possible to have multiple trusted SLA brokers, in which the SLA brokers may either maintain redundant copies of the SLA information or may maintain subsets of the available SLA information and cooperatively work to determine end-to-end service offerings on the network.

If the SLA offerings are to be advertised publicly (110), when a domain receives an SLA advertisement it will store the SLA offerings that have been advertised by the other domains in its SLA database (112). If a service is later required to be implemented that needs to span across multiple domains (114) the initiating system will review the SLA offerings that have been advertised by the other domains to select a set of domains for the new service (116).

If the SLA offerings are partially advertised and partially kept private, for example in the case of provider who wants its SLA to be exposed only by a set of preferred set of third party providers who could use it to realize their service or when a domain wishes to advertise its capabilities but not its pricing information, or only advertise selected pricing information, the domains may advertise that portion of the SLA offerings that is deemed acceptable to be public information. The other information, that the domain would like to keep confidential, may be transmitted securely to a SLA broker (120). Another example where this may be implemented may be where two or more domains are owned by the same entity. The affiliated domains may wish to exchange SLA information with each other, but not allow other non-affiliated domains from learning the SLA information. The affiliated domains may transmit SLA information between each other and use the trusted SLA broker to interface with the other non-affiliated domains. The domains, in this embodiment, will store whatever SLA information is received in their SLA database (122). Allowing affiliated domains to selectively transmit SLA information with each other while keeping the SLA information private from other non-affiliated domains allows the domains to be formed in a hierarchical manner.

If a service is to be implemented that is required to span across multiple domains (124) the initiating system will review the SLA offerings that have been advertised by the other domains to select a set of domains for the new service (126). If the domain is not able to select a set of domains for the service from the SLA information that has been advertised publicly, the domain may contact the SLA broker to request the SLA broker to select a set of domains for the service (128). In this way, the publicly available information may be used first and, if the publicly available information is insufficient, a request may be sent to the SLA broker to have the SLA broker select the set of domains or a complementary set of domains for the service. Alternatively, the two processes 126, 128, may proceed at the same time to provide the initiating system with multiple SLA offerings at once rather than proceeding sequentially.

The domains may also want to keep all of their SLA information secure. In this instance, the domains may transmit SLA offering information privately to the SLA broker instead of advertising it on the network (130). In this embodiment, the domains would store their SLA information in their SLA database and not have access to other SLA information of other domains (132).

If a service is to be implemented that is required to span across multiple domains (134) the initiating system will contact the SLA broker to request a set of domains for the new service (136). The SLA broker will review SLA offerings transmitted to it by the domains and select a set of domains to be used to implement the new service (138). The SLA broker will then return a set of domains for the service to the domain that initiated the selection process (140). Optionally, the SLA broker may interface with the SLA agents on each of the other domains to help set up the new service on the network.

Figure 6:
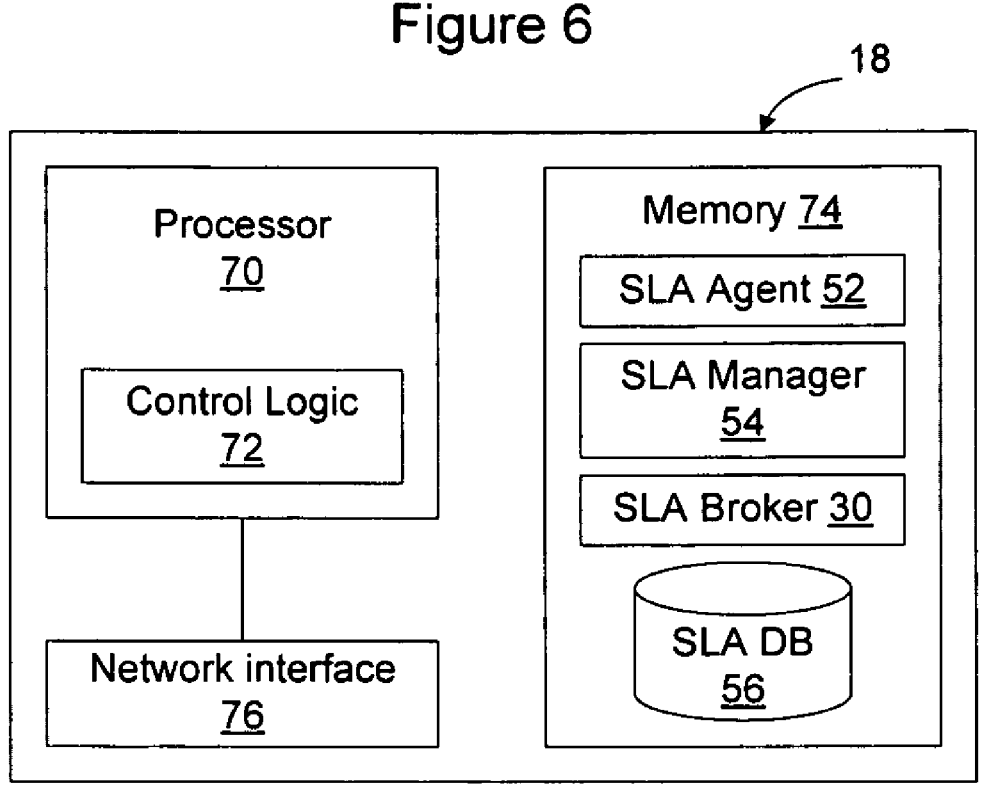
FIG. 6 is a functional block diagram of an example SLA system implemented in a network element.

FIG. 6 shows an example network element that may be used to implement an SLA service 18 according to an embodiment. As shown in FIG. 6, the network element includes a processor 70 containing control logic 72 that is able to be programmed to enable the network element to perform the functions described herein to implement the SLA system 18. For example, a memory 74 may be provided and contain software to enable the network element to implement the functions of the SLA agent 52 and SLA manager 54. Additionally, the memory may contain an SLA database 56 or contain database access software that may enable the network element to access an external SLA database 56. Where the network element is to be used to implement the SLA broker 30, a software module may be provided that will enable the network element to be configured to perform the functions ascribed to the SLA broker as well.

Although the SLA manager and SLA agent are shown as being implemented on the same network element, these components may be separately implemented on different network elements as well. The network element may contain one or more network interfaces 76 and other common functional components to enable the network element to function as a stand-alone server implementing the SLA service 18 or SLA broker 30, or may be contain components to enable the network element to implement other functions on the network, such as to enable the network element to handle data on the network or to perform other services on the network.

The functions described above may be implemented as one or more sets of program instructions that are stored in a computer readable memory within the network element(s) and executed on one or more processors within the network element(s). However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of exchanging Service Level Agreement (SLA) information between domains on a network, the method comprising the steps of:
   discovering first SLA information available in a first domain, the first SLA information being node-pair specific and relating to capabilities of the domain to provide service through the domain between a pair of border nodes;
   transmitting the first SLA information, from the first domain to a plurality of peer domains on the network, without the use of a trusted SLA broker;
   receiving second SLA information, by the first domain from each of the peer domains on the network, without the use of the trusted SLA broker;
   using the first SLA information from the first domain and the second SLA information from each of the peer domains to build a SLA database for the first domain; and
   when a new service is to be offered on the network that is required to span from the first domain to one of the peer domains, using the first and second SLA information in the SLA database to select a set of domains for the service.

2. A method of exchanging Service Level Agreement (SLA) information between domains on a network, the method comprising the steps of:
   discovering SLA information available in a first domain, the SLA information being node-pair specific and relating to capabilities of the domain to provide service through the domain between a pair of border nodes; and
   transmitting the SLA information to enable the SLA information to be used when another domain is seeking to set up a service on the network;
   wherein some of the SLA information is transmitted to the other domains on the network and some of the SLA information is transmitted only to a trusted SLA broker on the network.

3. The method of claim 2, wherein the trusted SLA broker uses the SLA information to choose a set of domains on behalf of the domain seeking to set up the service on the network.

4. The method of claim 2, wherein the SLA information comprises performance related metrics and business metrics.

5. The method of claim 4, wherein the performance related metrics relate to guarantees the network offers.

6. The method of claim 5, wherein the performance related metrics include quality of service, availability, and security properties of a service that is available and guaranteed to be provided by the network between the pair of nodes.

7. The method of claim 6, wherein the SLA broker uses the SLA information to choose a set of domains on behalf of the domains seeking to set up the service on the network, and wherein the SLA broker also monitors the services after the services are established to ensure compliance by the domains with the SLA information.

8. The method of claim 4, wherein the business metrics define the service offering in terms of pricing and also include context, and behavioral properties of customers being served in the domains associated with the SLA information.

9. The method of claim 8, wherein the business metrics further include demography, context, and subscriber behavioral characteristics.

* * * * *